(12) United States Patent
Pirotais

(10) Patent No.: US 6,937,930 B2
(45) Date of Patent: Aug. 30, 2005

(54) TRANSMISSION CONTROL SYSTEM

(75) Inventor: Jacques Pirotais, Glatigny (FR)

(73) Assignee: AGCO SA, Beauvais (FR)

( * ) Notice: Subject to any disclaimer, the term of this patent is extended or adjusted under 35 U.S.C. 154(b) by 15 days.

(21) Appl. No.: 10/742,472

(22) Filed: Dec. 18, 2003

(65) Prior Publication Data

US 2004/0193350 A1 Sep. 30, 2004

(30) Foreign Application Priority Data

Dec. 19, 2002 (GB) .............................................. 0229451

(51) Int. Cl.[7] .............................................. G06F 19/00
(52) U.S. Cl. ........................... 701/54; 701/110; 477/54; 477/161; 477/44; 123/90.11; 192/105 C
(58) Field of Search ........................ 192/105 C; 701/51, 701/54, 110, 70, 103, 52; 477/44, 161, 97, 54, 168, 181, 120, 117; 123/90.11, 90.15; 180/65.2, 244, 247, 250; 362/459; 340/425.5, 438, 459

(56) References Cited

U.S. PATENT DOCUMENTS

| | | | |
|---|---|---|---|
| 4,366,889 A | | 1/1983 | Wang |
| 5,056,376 A | | 10/1991 | Moroto et al. |
| 5,401,223 A | | 3/1995 | White et al. |
| 5,560,203 A | | 10/1996 | Pollman |
| 5,638,271 A | * | 6/1997 | White et al. .................. 701/64 |
| 5,884,208 A | * | 3/1999 | Byon ......................... 701/110 |
| 6,059,689 A | * | 5/2000 | Shimizu et al. ............... 477/98 |
| 6,165,102 A | * | 12/2000 | Bellinger ..................... 477/54 |
| 6,231,477 B1 | * | 5/2001 | Hollingsworth et al. .... 477/107 |
| 6,502,476 B2 | * | 1/2003 | Genise ..................... 74/336 R |
| 6,544,141 B1 | * | 4/2003 | Fuchs et al. .................. 477/44 |
| 6,577,938 B1 | | 6/2003 | Bellinger et al. |
| 6,589,134 B2 | * | 7/2003 | Williams et al. .............. 477/99 |
| 2002/0028727 A1 | * | 3/2002 | Iida et al. .................... 477/125 |
| 2003/0000324 A1 | | 1/2003 | Bjorkgard |
| 2003/0060329 A1 | * | 3/2003 | Sato et al. .................. 477/121 |
| 2003/0119631 A1 | * | 6/2003 | Yoneyama .................. 477/156 |
| 2003/0232680 A1 | | 12/2003 | Matsunaga et al. |
| 2004/0102885 A1 | * | 5/2004 | Genise ........................ 701/67 |

FOREIGN PATENT DOCUMENTS

| | | |
|---|---|---|
| DE | 10040203 A1 | 3/2001 |
| DE | 10202774 A | 7/2003 |
| EP | 0270194 A2 | 6/1986 |
| EP | 1091146 A1 | 4/2001 |
| EP | 1172248 A2 | 1/2002 |

OTHER PUBLICATIONS

European Search Report dated Feb. 24, 2004.

\* cited by examiner

*Primary Examiner*—Thomas G. Black
*Assistant Examiner*—Tuan C To
(74) *Attorney, Agent, or Firm*—Troutman Sanders LLP; Gerald R Boss

(57) ABSTRACT

An apparatus controls a vehicle having an engine including a throttle having a throttle position sensor, the throttle being adjustable to vary the speed of the vehicle, a transmission having an input shaft, an output shaft, and drive means there between providing a variable drive ratio, and a transmission controller for controlling the drive ratio between said input and output shafts, and at least one axle in driving connection with the output shaft of the said transmission, wherein the controller comprises a selector operable to select between first and second modes of operation, in said first mode the throttle and transmission are operated individually by the operator in said second mode, operation of the throttle and transmission is interconnected and performed by means of a computer program.

10 Claims, 3 Drawing Sheets

TRANSMISSION CONTROL SYSTEM

This application claims priorty based on United Kingdom Patent Application Ser. No. 0229451.0, filed on Dec. 19, 2002.

FIELD OF THE INVENTION

The invention relates to transmissions for vehicles, and in particular to transmissions which can change ratio under load, for example a continuously variable transmission, or a powershift transmission.

BACKGROUND TO THE INVENTION

The invention is concerned with vehicles having wheels or tracks, an engine and a transmission. The purpose of a transmission is to vary the speed of the shafts driving the wheels or axles in order to vary the speed of the vehicle. For most vehicles speed can be adjusted in one of two ways: either the engine throttle can be adjusted to increase or decrease the speed of the engine, or the ratio of the transmission can be changed. In some applications, for example agriculture, forestry, and construction it is preferable to be able to set a desired forward speed without changing the engine speed (for example when a forage harvester is driven from a tractor's power take off, the engine must rotate at a substantially fixed speed for the forage harvester to operate properly), and it is for this reason that such vehicles are either provided with transmissions having a large number of ratios, or transmission where the drive ratio is continuously variable. Vehicles not having such requirements, such as a car need only be provided with a transmission having relatively few ratios, for example four or five, because for such vehicles it is acceptable for some of the variation in forward speed to be provided by variation in the vehicle's engine speed.

In addition to being used in applications where it is necessary to vary forward speed without varying engine speed, vehicles such as agricultural, forestry and construction vehicles are also used in applications where varying the forward speed by a combination of varying the engine speed and the transmission ratio is acceptable. For instance, agricultural tractors are often used on the road in haulage applications, e.g. for hauling loads from fields to stores.

When used in haulage applications the driver of an agricultural tractor must change the engine speed and the transmission ratio. In a continuously variable transmission he can select from an infinite number of ratios. In a transmission having discrete ratios, he may have to select a ratio from a choice of 32 possible ratios. This makes acceleration and deceleration a tiring task as the driver must make so many changes to the transmission ratio and the engine speed. Furthermore, when the desired travelling speed has been reached the driver may have to make further adjustments to the gear ratio due to changing loads on the vehicle, for example if a hill is encountered the load on the vehicle will rise and the engine speed will fall. If the torque reserve of the engine is accounted for by the increase in load it will be necessary for the driver to change the transmission ratio.

It would therefore be desirable to automate the operation of the transmission and throttle in order to optimise the efficiency of operation of the vehicle, and to reduce driver fatigue.

SUMMARY OF THE INVENTION

According to the present invention, there is provided a method for controlling a vehicle. This controlling of the vehicle has a engine which has a throttle with a throttle position sensor. The throttle is adjustable to the speed of the vehicle. The engine also has a transmission. The transmission has an input shaft, an output shaft, and a drive means there between which provide a variable drive ratio. The engine further has a transmission controller for controlling the drive ratio between the input and output shafts. The engine, finally, has at least one axle in driving connection with the output of shaft of the transmission.

The controller comprises a selector operable to select between first and second modes of operation. In the first mode, the throttle and transmission are operated individually by the operator. In the second mode, the operation of the throttle and transmission are interconnected and performed by a computer program.

The computer program includes the following steps: i) check that the throttle is closed; ii) if the throttle is closed, enter a calibration mode; iii) run a calibration test to calibrate throttle pedal positions corresponding to low and high engine idle speeds; iv) store the respective output value of the throttle position sensor corresponding to the low and high engine idle speeds; v) in use compare a signal representative of the theoretical forward speed generated by the output from the throttle position sensor with a signal representative of the actual forward speed of the vehicle to establish the load on the engine vehicle, and generate an output signal representative of engine load; and vi) send signal to the transmission controller to adjust the transmission ratio to match forward speed to theoretical speed, thereby reducing the engine load.

BRIEF DESCRIPTION OF THE DRAWING

In the drawings, which illustrate an exemplary embodiment of the invention.

DETAILED DESCRIPTION OF THE PREFERRED EMBODIMENTS

Figure 1:
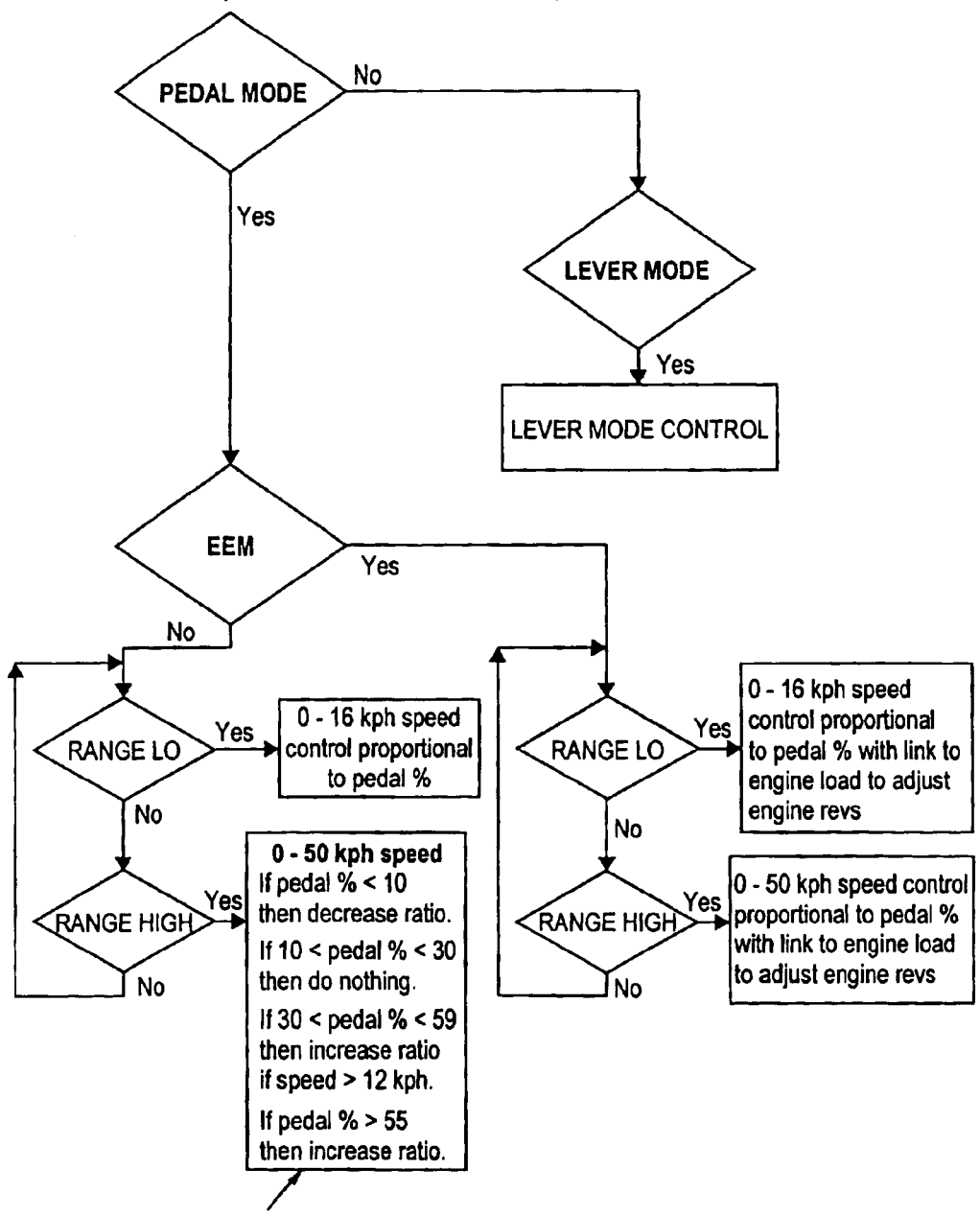
FIG. 1 is a flow chart illustrating the method of the invention.

Referring now to FIG. 1, there is shown a flow chart illustrating the method of the invention.

Figure 2:
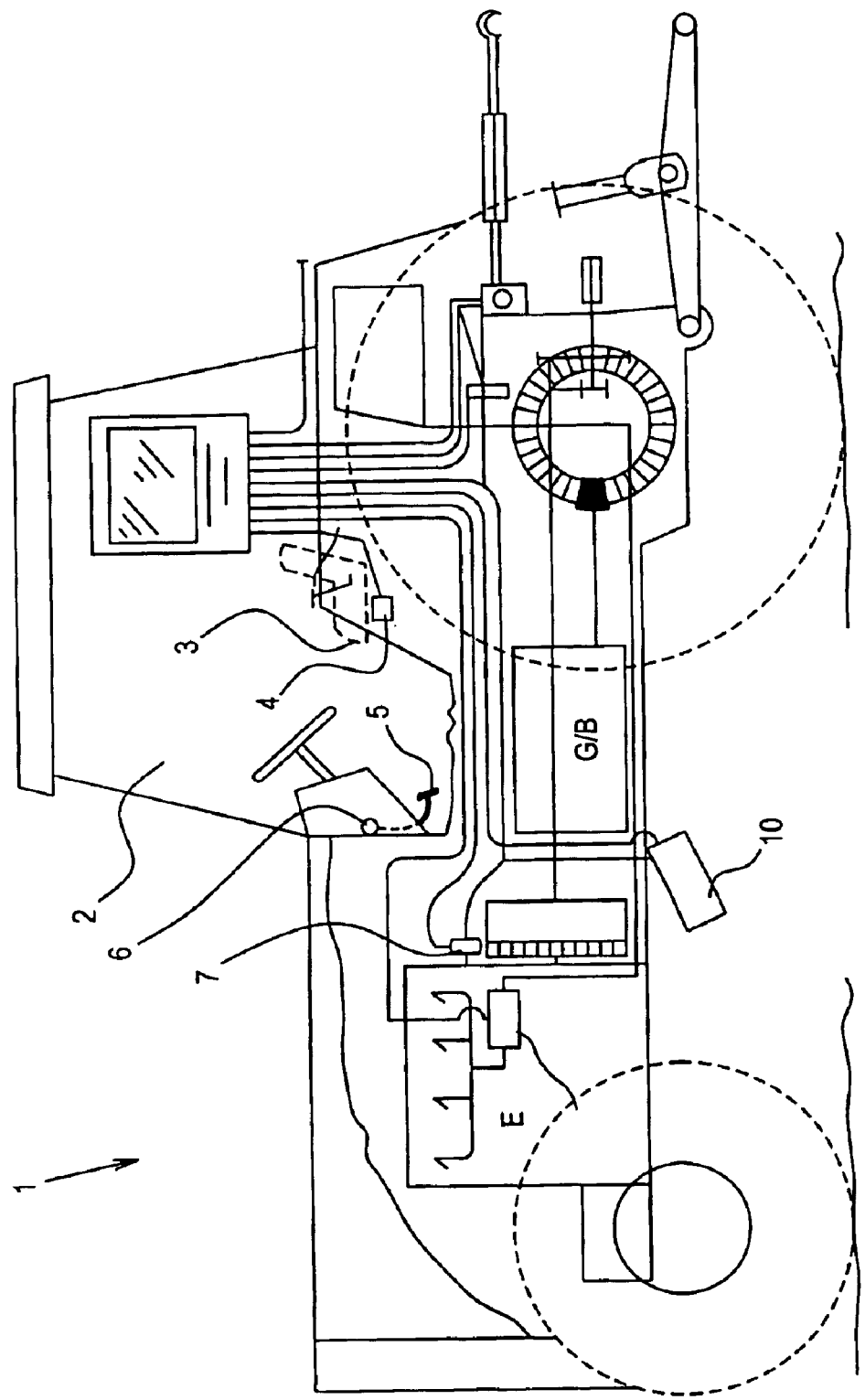
FIG. 2 is a schematic representation of a tractor having a controller, controlled according to the method of the invention.
Figure 3:
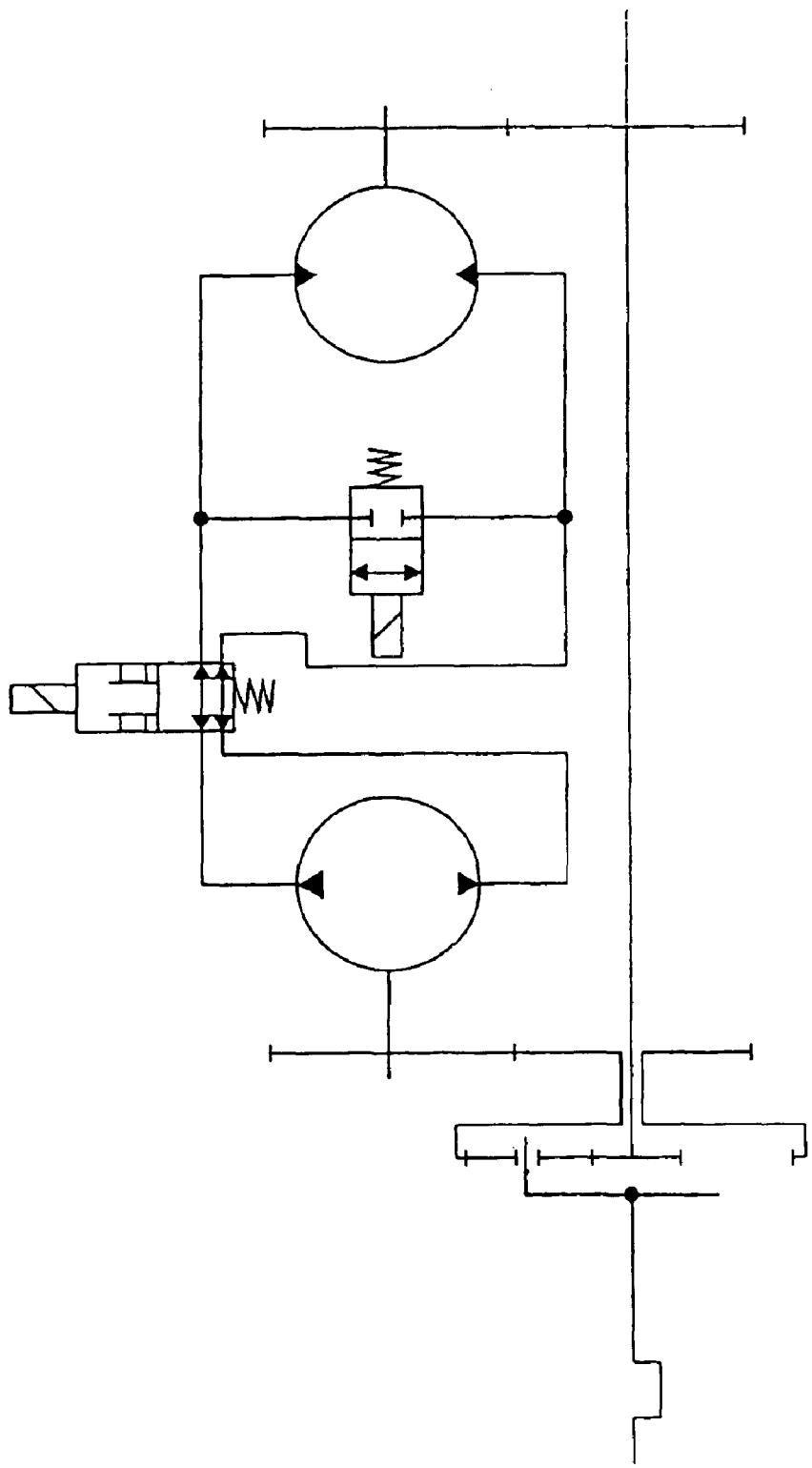
FIG. 3 is a schematic representation of a continuously variable transmission.

FIG. 2 illustrates an agricultural tractor 1, having an operator's platform 2. The operator's platform 2 includes an operators seat 3 and an operator presence sensor 4. The operator presence sensor 4 generates an electronic signal indicating the presence or lack of presence of an operator. The electronic signal may be used as an input to the electronic control systems of the tractor. For example, engagement of the tractor transmission may be prevented in the absence of a signal from the operator presence sensor 4 indicating the presence of an operator.

The agricultural tractor 1 shown in FIG. 2 is generally of a type well known to those skilled in the art. It comprises a pair of spaced apart axles, each axle having wheels on the opposite ends thereof, an engine, and a transmission having a low range to high range. The tractor may be used in a variety of different applications, for example, cultivations, harvesting, spraying and spreading or haulage.

FIG. 1 illustrates the method by which the transmission controller operates.

The transmission controller may be operated in two different selectable modes, namely lever mode and pedal mode. A switching means (not shown) is provided in the operator's platform for selection between the modes.

Lever Mode

In the lever mode, the engine speed and the transmission are controlled independently, and in any one particular ratio, the speed of the tractor is proportional to the degree to which the throttle is open, and hence speed is proportional to the position of the throttle lever for any one ratio.

Pedal Mode

The other mode which the transmission controller may operate is referred to as the "Pedal Mode". In "Pedal Mode", for a vehicle with mechanical engine management, the driver can select one of two engine speeds, for example either full engine speed (e.g. 2250 r.p.m.), or 80% of full engine speed (e.g. 1800 r.p.m.). With the engine speed selected the drive ratio of the tractor is either controlled in accordance with engine load according to the opening of the throttle, or an algorithim, depending on whether the transmission is in a low range or high range. For example, if the operator selects, in either high or low range, a particular forward speed, in power mode the selected forward speed will be reached at full engine speed, whereas in economy mode the selected forward speed will be reached at 80% of full engine speed.

With the tractor in low range, in which a desired maximum travel speed of between a preset minimum and maximum speed can be selected, the transmission is controlled according to engine load i.e. as the engine load is increased, the transmission ratio is decreased to reduce the load if the engine load is too great for the engine to reach the selected engine speed.

With the tractor in high range in which a desired maximum travel speed of between a preset minimum and maximum speed (set by construction and depending transmissions) can be selected, the transmission ratio of the tractor is varied in accordance with an algorithim, for example.

1) If the pedal position provides a throttle opening of less than 10%, the transmission ratio is decreased;

2) If the throttle opening is greater than 10%, the transmission ratio is changed with the position of foot or hand throttle.

If the tractor is provided with electronic engine management, then tractor speed is controlled according to engine load with engine speed remaining constant and the transmission ratio being adjusted to vary forward speed without affecting engine speed.

The engine load is calculated by comparing the actual engine speed with the theoretical speed, which is proportional to the degree to which the throttle is open. The throttle opening is measured by sensing the position of the accelerator pedal 5, which is measured by a potentiometer connected to the accelerator pedal 5. As the position of the accelerator pedal is changed, the potentiometer is adjusted, and the output voltage thereof varies.

The actual engine speed is measured by a sensor 7 which provides an output, in this case electronic, representative of engine speed.

By comparing the electronic signals representing actual engine speed and theoretical engine speed, the difference between the two can be established. It is the difference which is representative of engine load.

The operation of Pedal Mode for a vehicle including an electronic engine management system will now be described with reference to the flow chart shown in FIG. 1, with the tractor in low range, the drive ratio is controlled according to engine load in the same manner as previously described for a vehicle not having electronics unless the detected engine load is less than X%. If the engine load falls below X%, the engine speed is reduced and the transmission ratio increased to provide better fuel economy. Such a situation could arise if the vehicle were on a haulage application and encountered a decline. X% is a threshold set to suit the individual characteristics of a particular engine.

With the tractor in high range, the drive ratio is controlled in the same manner as in low range, but the engine load threshold Y% is not necessarily the same as X%. The threshold Y% is also set to suit the individual characteristics of a particular engine.

The transmission ratio is controlled by at least one actuator responsive to an electronic signal from a transmission controller, the controller includes a microprocessor and memory upon which operational instructions for control of the transmission are stored. In this example, the operational instructions are stored as a computer program.

The transmission controller receives a number of inputs, in this example in the form of electronic signals, the inputs including the electronic signal from the throttle pedal position sensor 6, the actual speed sensor 10, which inputs are used in the generation of outputs to said actuator(s).

For a tractor equipped with Electronic Engine Management (EEM), PEDAL mode provides three different sub-modes of operation, which are described below.

Pedal Mode for Tractor with EEM

Pedal Power Mode

In the PEDAL POWER MODE the tractor travel speed is controlled in accordance with the following algorithm;

travel speed=Maximum travel speed at selected engine speed×(pedal position %−$X$%)/(100−$Y$%).

where X=10 and Y=10 engine speed=Maximum engine speed×pedal position %/100

Pedal Economy

In the PEDAL ECONOMY MODE the tractor travel speed is controlled in accordance with the following algorithm;

travel speed=maximum travel speed at selected engine speed×(pedal position %−$X$%)/(100−$Y$%)

where X=10 and Y=10 engine speed=$R$×pedal position %/100 where R is 1800 RPM

In the sub-modes Pedal Power and Pedal Economy, the throttle position controls the CVT ratio. In this example, there is a mechanical link between the hand and foot throttle levers, and therefore the operator may use either of these control means to change the CVT ratio.

In use the operator selects one of two engine speeds. One engine speed corresponds to maximum engine power and the other to an engine speed corresponding to maximum torque.

The travel speed is then governed in accordance with the algorithm travel speed=maximum travel speed at selected engine speed×(pedal position−X%)/(100−Y%).

In the sub-mode Pedal Power or Economy or PTO, the value of X is 10 and the value of Y is 10. Therefore in Pedal Economy, sub-mode the travel speed of the vehicle is greater for a given engine speed.

The algorithm is operable with the vehicle in either high or low range.

Pedal Power Take Off (PTO) Mode

The third sub-mode of the Pedal Mode is referred to as Pedal PTO MODE, and is useful when the tractor is drawing implements through its power take off, e.g. a forage harvester.

In Pedal Mode PTO, the electronic engine management system is provided with a number of operating curves.

travel speed=maximum travel speed at selected engine speed× (pedal position %−X%)/(100−Y%)

where X=10 and Y=10 engine speed=memorised Engine speed A or memorised Engine speed B set by the driver between the minimum and maximum engine speeds.

In use, the operator selects one of two engine speeds A or B. The forward speed of the vehicle is then varied by changing the ratio of the CVT. However, the different operating curves of the EEM allow engine speed to be maintained under slight variations in vehicle load. For example, a power boost curve which the EEM switches to when the vehicle encounters a slight increase in load increases engine power output and maintains engine speed and therefore the operator does not need to adjust the CVT ratio. If the vehicle load increase is greater than the increase in engine power provided by the power boost curve, the engine speed will fall, and it is then necessary to adjust the CVT ratio. In the example adjustments of the CVT ratio is made by the operator adjusting either the hand or foot throttle lever, which is linked to the CVT, such that movement of a throttle lever causes the ratio of the CVT to change.

To operate the tractor in "Pedal Mode" it is necessary to calibrate the engine speed with the pedal position sensor.

The tractor is therefore provided with a calibration mode.

To enter the calibration mode the driver selects "calibration mode" through a user interface, in this example the user interface is known as the "Driver Cab Controller" (DCC). The DCC includes a screen upon which instructions in the form of text or images may be displayed. When the calibration mode is entered, the operator is instructed in the performance of the calibration routine.

The first step of the calibration routine is to calibrate a low idle speed. The operator is instructed to release the throttle, i.e. remove his foot from the throttle pedal and close the throttle lever, and to validate that this has been done. In the example validation may be by pressing a button on the DCC. The engine speed sensor 7 monitors the engine speed for a short period, in this example 1.5 to 2 seconds, and if engine speed variation in that period is minimal (for example less than 30 revolutions per minute), then voltage output from the potentiometer is recorded as the throttle closed voltage. If the variation in engine speed is not minimal, the calibration routine is ended and the driver instructed to recommence the routine.

If calibration of the throttle closed position is successful, the operator is taken to the next step in the routine, which is to calibrate a high idle speed.

The operator is instructed to open the throttle until the engine speed reaches a high idle speed, which in this case is 1800 revolutions per minute. The throttle can be opened either by the throttle lever or the throttle pedal since the throttle lever moves the throttle pedal, movement of either adjusting the potentiometer, and hence its output.

Once the high engine speed has been reached, the operator is instructed to validate, which as before requires the operator to press a validation button. The engine speed sensor then monitors the engine speed for a short period of time, in this example 1.5 to 2 seconds, and if engine speed variation during that period is minimal (for example less than 30 revolutions per minute) then voltage output from the potentiometer for the high idle speed is recorded. If the variation in engine speed is greater that minimal, then the high idle speed calibration routine is re-run.

The invention provides a simple method of automatically matching the drive ratio to the load experienced by the vehicle at any given moment, reducing driver stress, and increasing the efficiency of operation of the vehicle.

What is claimed is:

1. An apparatus for controlling a vehicle having an engine including a throttle having a throttle position sensor, the throttle being adjustable to vary the speed of the vehicle, a transmission having an input shaft, an output shaft, and drive means there between providing a variable drive ratio, and a transmission controller for controlling the drive ratio between said input and output shafts, and at least one axle in driving connection with the output shaft of the said transmission;

wherein the controller comprises a selector operable to select between first and second modes of operation, in said first mode the throttle and transmission are operated individually by the operator; and in said second mode, operation of the throttle and transmission is interconnected and performed by means of a computer program which includes an algorithm including the following steps:
i) check that the throttle is closed;
ii) if the throttle is closed enter a calibration mode;
iii) run a calibration test to calibrate throttle pedal positions corresponding to low and high engine idle speeds;
iv) store the respective output values of the throttle position sensor corresponding to the low and high engine idle speeds;
v) in use compare a signal representative of the theoretical forward speed generated by the output from the throttle position sensor with a signal representative of the actual forward speed of the vehicle to establish the load on the engine, and generate an output signal representative of engine load,
vi) send signal to the transmission controller to adjust the transmission ratio to match forward speed to theoretical speed, thereby reducing the engine load.

2. An apparatus according to claim 1, wherein the transmission comprise two selectable ranges, a low range and a high range and wherein in the low range the drive ratio is varied in proportion to the engine load signal, the drive ratio being varied to reduce engine load and wherein in the high range the transmission ratio is controlled according to an algorithim.

3. An apparatus according to claim 2, wherein a high range the transmission is controlled according to the following algorithm:
i) operator sets a desired maximum travel speed between preset minimum and maximum travel speed;
ii) if the throttle portion sensor includes a throttle opening of less than 10%, decrease the transmission ratio; and
iii) if the throttle opening is greater than 10%, vary the transmission ratio in proportion to throttle opening indicated by the throttle portion sensor.

4. An apparatus for controlling a vehicle having an engine including a throttle having a throttle position sensor, the throttle being adjustable to vary the speed of the vehicle, a transmission having an input shaft, an output shaft, and drive means there between providing a variable drive ratio, and a transmission controller for controlling the drive ratio between said input and output shafts, and at least one axle in driving connection with the output shaft of the said transmission;

wherein the controller comprises a selector operable to select between first and second modes of operation, in said first mode the throttle and transmission are operated individually by the operator; and in said second mode, operation of the throttle and transmission is interconnected and performed by means of a computer program wherein the engine includes an electronic engine management system, and wherein the transmission comprises two selectable ranges, a low range and a high range, and wherein in either low or high range the drive ratio is varied in proportion to engine load, the ratio being decreased to bring the engine load towards a load threshold, and wherein if the measured engine load is below said threshold, decrease the engine speed and/or increase the drive ratio to bring the engine load to said load threshold.

5. An apparatus according to claim 1, wherein the said drive means providing a variable drive ratio comprises a continuously variable transmission, providing a continuously variable drive ratio.

6. An apparatus according to claim 1, wherein said throttle position sensor is linked to the transmission controller to adjust said drive ratio.

7. An apparatus according to claim 4, wherein travel speed of said vehicle is controlled according to the algorithm; Travel speed=(Maximum travel speed at a selected engine speed)×((pedal position %−X%)/(100−Y%)).

8. An apparatus according to claim 4, which has a further Power Take Off Mode with means for selecting first or second engine speeds which it is desired to maintain, and wherein said electronic engine management system includes a plurality of selectable engine operating curves, and wherein upon detection of a change in engine load above a predetermined percentage, the electronic engine management system selects an engine operating curve to try to restore the previous engine load and maintain the selected engine speed.

9. An apparatus according to claim 4, wherein the said drive means providing a variable drive ratio comprises a continuously variable transmission, providing a continuously variable drive ratio.

10. An apparatus according to claim 4, wherein said throttle position sensor is linked to the transmission controller to adjust said drive ratio.

* * * * *